United States Patent [19]
Allen

[11] Patent Number: 6,165,371
[45] Date of Patent: Dec. 26, 2000

[54] OFF-SHORE SEWAGE TREATING AND HANDLING APPARATUS AND METHOD

[76] Inventor: John Leon Allen, 19 Stratton Hill Bay S.W., Calgary, Alberta, Canada, T3H 1X6

[21] Appl. No.: 09/142,335

[22] PCT Filed: Mar. 12, 1997

[86] PCT No.: PCT/IB97/00497

§ 371 Date: Sep. 4, 1998

§ 102(e) Date: Sep. 4, 1998

[87] PCT Pub. No.: WO97/33789

PCT Pub. Date: Sep. 18, 1997

Related U.S. Application Data

[60] Provisional application No. 60/013,281, Mar. 12, 1996.

[51] Int. Cl.[7] .............................. C02F 9/00; B63B 35/44; B63B 17/00
[52] U.S. Cl. ................... 210/747; 210/170; 210/242.1; 210/919; 210/920
[58] Field of Search .................................. 210/601, 747, 210/805, 806, 170, 241, 242.1, 242.2, 919–921

[56] References Cited

U.S. PATENT DOCUMENTS

| | | | |
|---|---|---|---|
| 3,703,960 | 11/1972 | Kennedy | 210/170 |
| 3,755,142 | 8/1973 | Whipple, Jr. | 210/242.2 |
| 3,870,634 | 3/1975 | Humphrey | 210/241 |
| 4,008,155 | 2/1977 | Castell | 210/242.1 |
| 4,217,848 | 8/1980 | Meyer-Hoake | 114/264 |
| 4,469,596 | 9/1984 | Kantor | 210/170 |
| 4,692,249 | 9/1987 | Hammel | 210/170 |
| 5,032,289 | 7/1991 | Martineau | 210/747 |
| 5,089,120 | 2/1992 | Eberhardt | 210/170 |
| 5,316,671 | 5/1994 | Murphy | 210/242.2 |
| 5,785,865 | 7/1998 | Sais | 210/747 |

FOREIGN PATENT DOCUMENTS

| | | |
|---|---|---|
| 0165328 | 12/1985 | European Pat. Off. . |
| 59-053296 | 3/1984 | Japan . |

*Primary Examiner*—Thomas S. Wyse
*Attorney, Agent, or Firm*—Harold H. Dutton, Jr.

[57] ABSTRACT

Apparatus and method for accommodating and handling excess deliveries of combined sewage overflows to a sewage treatment plant supported and contained within an offshore moored vessel or platform, by diverting the excess deliveries to ballast tanks for temporary displacement of clean ballast water and to be returned to the treatment system when excess deliveries of combined sewage overflow are relieved. Fluids contained within the ballast tanks are utilized to provide buoyant support for process tankage. Baffles within the ballast tanks minimize undesirable mixing of the combined sewage overflows with the resident clean ballast water.

6 Claims, 2 Drawing Sheets

OFF-SHORE SEWAGE TREATING AND HANDLING APPARATUS AND METHOD

This application is a continuation of Provisional Application Ser. No. 60/013,281, filed Mar. 12, 1996.

FIELD OF INVENTION

The present invention relates to a method and apparatus for the collection, handling and treatment of municipal sewage by a conventional sewage treatment system supported and contained within an offshore moored vessel or platform adjacent a municipal sewage gathering system.

BACKGROUND

The advantages of locating a complete sewage processing facility offshore to accommodate the sewage waste disposal requirements of an adjacent community, have been recognized in the prior art. Patents to Martineau U.S. Pat. No. 5,032,289, Kantor U.S. Pat. No. 4,944,872 and Hammel U.S. Pat. No. 4,692,249 exemplify apparatus and methods heretofore proposed for offshore treatment of sewage, in which primary and secondary sewage treatment facilities have been proposed for mounting on a moored vessel or offshore platform, in which waste water treatment and disposal, digestion of solids and their dehydration and disposal, are described.

Development of such proposals has been restricted by economics of scale and lax or non-existent environmental requirements. Further, none of the prior art systems disclose designs capable of handling peak volumes of sewage or accommodating plant overload conditions when storm sewer runoffs are tied into sanitary sewer systems, thereby producing combined sewer outflows ("CSOs").

When the CSO's exceed the treatment capacity of the prior art systems, such excesses have heretofore of necessity been deumped into the marine environment, causing pollution. The Marineau U.S. Pat. No. 5,032,289 describes an offshore sewage treatment facility with this limitation.

Additionally, technical problems arise from support and structural difficulties when extremely heavy loads from waste-filled treatment facilities are installed on a floating or fixed offshore structure.

Floating installations in which the tankage volume is totally supported by a water volume contained within an exterior floating unit are already known. Japanese patent 59053296 to Hitachi Zosen discloses a double-hulled structure in which an interior floatable vessel used for plant-support, is floated within an exterior floatable vessel, the system being adapted for movement to a suitable location at which the exterior floatable vessel is sunk to the sea bottom, leaving the interior plant-supporting vessel floating within the gravity-based exterior vessel.

U.S. Pat. No. 4,217,848 to Meyer-Haake discloses a double hulled system in which the interior tankage is used as a floating gas liquefaction unit, supported within an annular floating unit, both units being floated independently of one another in a marine environment.

In each of these prior art descriptions, the operative vessel is totally and independently floated and utilizes the exterior vessel in a minor and ancillary role.

European patent 0 165 328 to INTEKA S.A. discloses a sewage treatment system in which the primary sewage treatment is performed on a land-based facility, following which the discharged effluent is pumped into a secondary clarification system, the latter being installed in a converted oil tanker. Within the oil tanker, the effluent is aerated and contained sludge is settled in a secondary on-board system of tanks, each of these being structurally supported from the underlying hull of the oil tanker. Cleaned effluent is then discharged for disposal into the marine environment.

None of the prior art references disclose means for float-supporting a weighted vessel which is structurally fixed in an interior water body, for either partial or total float-support of the weighted vessel against gravity forces.

SUMMARY OF THE INVENTION

The present invention is directed towards overcoming prior art deficiencies by providing a method, system and apparatus capable of accommodating peak volumes of sewage and CSOs in a floating or fixed gravity-based offshore structure.

The present invention is also directed towards overcoming the prior art design deficiencies by providing a system and apparatus capable of supporting a sewage treatment plant installed preferably, on a floating structure at the necessary deck-level elevation required to permit gravity flow of sewage and sewage effluent into and through the treatment plant for discharge into the outfall.

Alternatively, the treatment plant may be mounted on a platform floated into position, then gravity-based on the sea bed by flooding ballast tanks.

The moored vessel or platform, or any other water displacing hull is used as a foundation on which municipal sewage treatment plant facilities are installed. The structure incorporates ballast tanks that also serve as temporary storage reservoirs for excess CSO effluent when inlet flows exceed the treatment plant capacity.

The large clarifiers, aeration tanks, and other process tanks in the treatment plant are supported in part by the buoyant force of the liquid in the lower ballast/storage tanks. This unique "floating process tank" feature of the present invention reduces both the complexity and cost of structural foundations required to support these sewage-filled tanks.

The structure is positioned at the end of a municipal sewage main outfall and hooked up to receive sewage. The outfall may handle effluents from combined storm water and domestic sewage collectors, or from separate systems. A fixed breakwater is used to protect the structure where the protection of a natural harbor is not presently available.

Once the structure has been positioned, on-board ballast tanks are flooded with water, lowering the plant to the required elevation. Elevations of the onshore sewage outfall and the ballasted system are selected to provide a hydraulic profile that will permit gravity flow of sewage into the plant under all tide level conditions.

When mounted on a floating vessel, sewage outfall piping connections entering and exiting the moored system are equipped with flexible connector sections designed to allow for variations in the elevation of the plant that will occur as the water level changes due to tides or other factors.

Optionally, the floating structure, either a vessel or a marine platform, can be ballasted to rest on the sea bed, thereby to provide a semi-permanent location for the treatment facility.

The sewage treatment plant can utilize any one of the large number of processes available, as is the case with a land-based treatment plant. Ship or barge size and plant area requirements are taken into account when selecting the optimum treatment process.

Effluent from the onshore sewage mains flows into the flexible piping link through the sewage treatment plant where it is treated for primary and secondary waste water treatment and digestion, dehydration and drying of sludge and solids and pelletizing of sludge for industrial or agricultural uses, with clean effluent water being discharged into the marine environment through a treated effluent outfall.

The system is equipped with sewage recycle pumps for the purpose of pumping the stored CSO sewage out of the ballast tanks and into the front end of the treatment plant, and ballast pumps to pump seawater or effluent from the treatment plant into the ballast tanks.

When inflow CSO rates exceed the capacity of the treatment plant, the excess CSO is by-passed into the waterfilled ballast tanks, displacing clean ballast into the treated effluent outfall. The ballast tanks are equipped with a series of chambers and internal devices designed to minimize mixing between the clean ballast within the ballast tanks and the sewage entering the tanks. Excess CSO is temporarily contained in the ballast tanks, and stored for future processing through the sewage treatment plant. During periods when sewage inflow rates are below the plant capacity, the sewage recycle pumps are used to pump sewage out of the ballast tanks for delivery to the treatment plant. Alternatively, the ballast pumps are used to bring in seawater or plant effluent to maintain the required fluid levels for structure draft or gravity loading.

Optionally, clean treatment plant effluent is used as a ballast, rather than seawater, by diverting treatment plant discharge into the CSO sewage-filled ballast tanks as the CSO sewage is recycled for treatment.

In installations where the volumes of excess CSO can exceed the capacity of the main ballast tanks, a second tanker is floated into place, connected to the main tanks, and then used as a supplemental CSO containment reservoir.

The method herein described may conveniently be adapted to the conversion of surplus crude oil tankers to floating sewage treatment plants having the features of this invention. Such crude oil tankers of older design are normally of single-hull construction and are being replaced by double-wall hull design for reasons of environmental concern. Existing bulkhead compartments within the cargo storage areas within such older vessels are conveniently adaptable with minimum structural modifications to provide chambers for accommodating CSO fluids and seawater ballast. Further, the buoyant force of the clean ballast or CSO fluid within such a bulkhead compartment may be utilized to support process tankage such as a clarifier or aeration tank, thereby minimizing structural support otherwise required by the extreme heavy loads from such process tankage.

Optionally, the method herein described may conveniently be adapted to the conversion of surplus gravity-based offshore platforms to sewage treatment plants having the features of this invention.

There is thus described a municipal sewage treatment facility which has the ability to adjust the elevation of the process equipment by regulating the amount of clean ballast or sewage in ballast tanks, thereby establishing the proper equipment elevations required to permit the gravity flow of effluent from onshore sewage mains, through the treatment plant and into the marine environment, with the ability to accommodate changes to its elevation, raising or lowering as the level of the water changes, to achieve optimum operating hydraulic head conditions between onshore sewage mains, CSO storage tanks, treatment plant, and marine outfall.

There is further described a method of accommodating combined municipal sewage and storm water runoff in a sewage treatment system which incorporates ballast tankage as a reservoir to contain above-design sewage volumes and combined sewer overflow, to be stored for future processing through onboard sewage treatment facilities. Ballast tanks are used to collect and store excess sewage by displacing clean ballast during plant overload or combined sewer overflow conditions. Pumps, piping connections and valves are provided for the purposes of filling ballast tanks with seawater or plant effluent to displace sewage out of the tanks, and pumping sewage from storage tanks into the treatment plant when plant overload conditions return to normal.

Optionally, there is further described a sewage treatment system that incorporates ballast/sewage storage tanks having a series of chambers or internals which are designed to minimize the amount of mixing between (a) a liquid that is being introduced into the container, and (b) a liquid that was already in the container, and which is now being displaced from the container by the liquid being introduced; the liquid in both such cases so described, being either sewage or clean ballast.

Further optionally, there is described a municipal sewage treatment method adaptable to the conversion of surplus crude oil tankers to floating sewage treatment plants by utilizing fluid cargo compartments between existing bulkheads. Modification of such existing bulkheads result in a series of chambers for the flow and containment of fluids in order to minimize the intermixing of seawater ballast, sewage and CSOs. And still further optionally, existing bulkheads may be modified to adapt the upper portion of the bulkhead compartment to accommodate treatment tankage supported by the buoyant force of the underlying clean ballast or CSO fluids.

Further optionally, there is described a municipal sewage treatment method adaptable to the conversion of surplus gravity-based offshore platforms to sewage treatment plants by utilizing platform crude oil storage facilities and fixed structural foundations.

There is thus further described a municipal sewage treatment system that utilizes the buoyant force of the liquid in the ballast/CSO storage tanks to assist in supporting treatment plant tankage, and a municipal sewage treatment system that is connected to onshore sewage mains by means of flexible connections to allow for system elevation changes.

BRIEF DESCRIPTION OF THE DRAWINGS

These and other features of the present invention will become further clear from the following detailed description of the preferred embodiment taken with the attached drawings, wherein.

DETAILED DESCRIPTION OF THE PREFERRED EMBODIMENT

Figure 1:
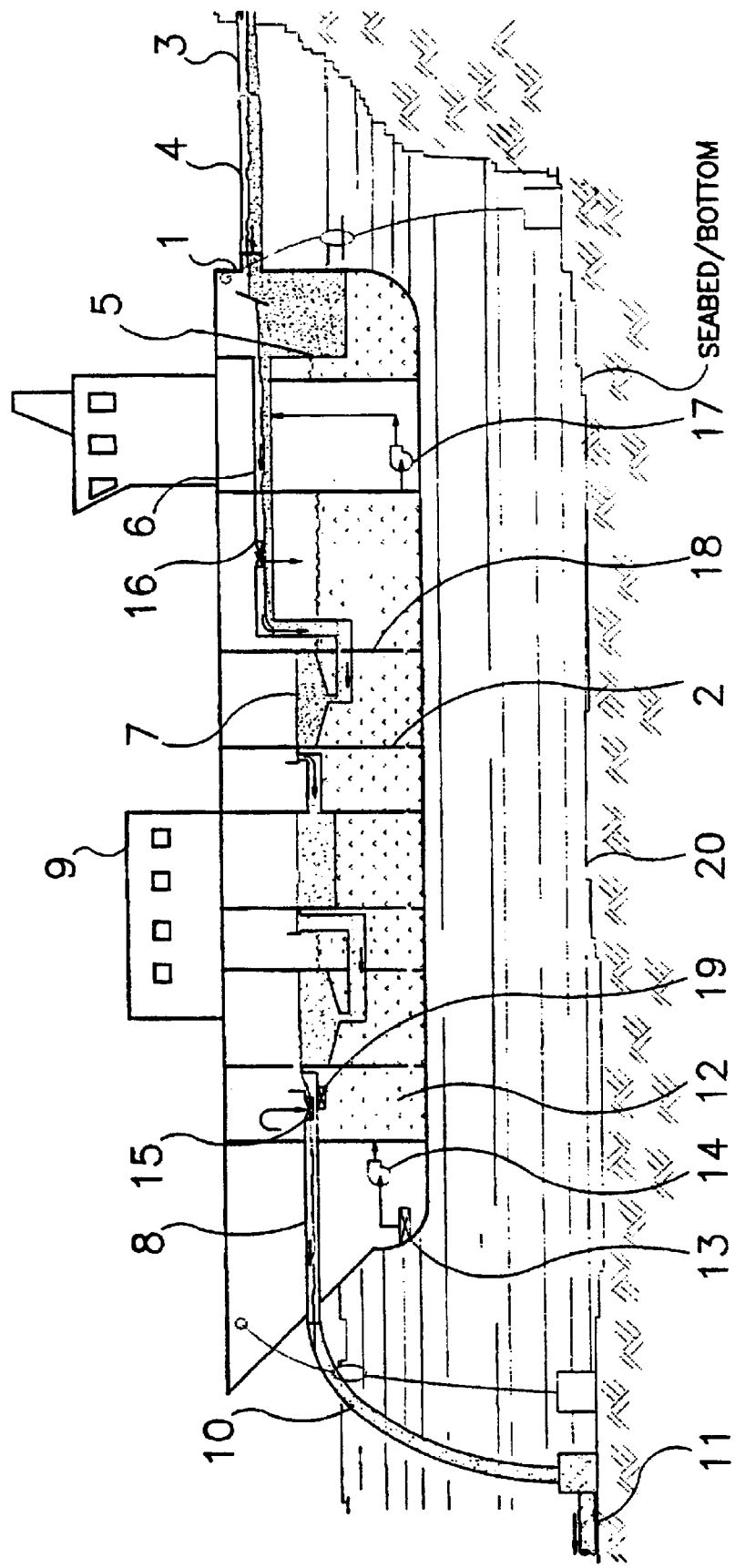
FIG. 1 is a longitudinal cross-sectional elevation through the hull of a floating vessel depicting an arrangement of process equipment suitable for the method of this invention.

In the accompanying drawings, FIG. 1 is a crosssectional elevation of a floating vessel typical of the preferred embodiment of the system of this invention, depicting a conventional sewage treatment facility constructed within and upon the hull 1 of a moored ship or specifically designed vessel, having internal bulkheads 2, the floating vessel being connected operationally to a municipal sewage main 3 by means of flexible piping 4.

Optionally, the hull 1 is further supported by lowering it onto a foundation 20 prepared on the sea bed.

Raw sewage delivered by gravity flow or pumped from the sewage main outlet is received initially in a receiving tank 5, where it flows by gravity through the pipe 6 to primary and secondary clarifiers and sedimentation tankage, digesters and aeration equipment 7 to the outfall 8. It will be understood that the treatment facility thus described is well known to those familiar with the art to which this invention relates, and as such forms no part of this invention. Sludge settling out in the primary and secondary clarifiers is pumped to the sludge treatment plant 9 for water recovery and drying, while flexible effluent outfall piping 10 delivers the treated effluent to a fixed outfall 11 for discharge into the sea.

Ballast seawater 12 is introduced into the floating hull 1 at the seawater inlet 13 by ballast pump 14, in order to stabilize the floating vessel at optimum elevation relative to the fixed sewer main 3, and to displace sewage from the tanks and to maintain required fluid levels for treatment tankage support.

Unique to this invention is the method and apparatus for accommodating excess CSOs or overload of sewage delivered to the facility consequent on heavy rains or flooding of the municipal storm sewer system which is frequently tied into the sanitary sewer system. When excess delivery of sewage or CSOs to the facility occurs, such excess is discharged from the pipe 6 at the CSO overflow port and valve 16, into the hull of the vessel, where it displaces clean ballast for discharge from the hull of the vessel through the outfall 8 by the seawater spillover 15.

Figure 2:
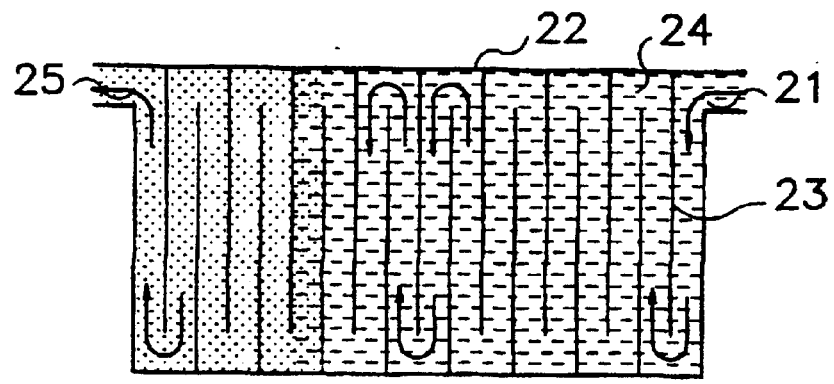
FIG. 2 is a cross-sectional elevation of a typical ballast tank modification according to the method of this invention in order to minimize mixing of resident and incoming fluids.

Bulkhead compartmentalization within the vessel's hull depicted at 18, and more particularly depicted in FIG. 2, is provided to minimize mixing of clean ballast and CSO thus introduced into the hull of the vessel.

FIG. 2 depicts a compartmentalization of the ballast/CSO sewage storage tanks to minimize mixing of the clean ballast with untreated sewage introduced into the ballast tank. Internal baffles 23 separate the contained fluids and direct the flow through the tank. Baffles may be installed in any plane or configuration suitable to the design conditions, to direct the flow of resident and entering fluids in order to establish a flow path of substantially reduced cross-sectional area, thereby reducing the interface between the two fluids, 24, 25, and minimizing undesirable intermixing. Discharge into the marine outfall of untreated CSO with clean ballast is minimized. Similarly, contamination of the clean ballast introduced into the ballast tanks by CSO displaced therefrom during the CSO treatment cycle is minimized.

When CSO conditions return to normal, CSO will be returned from the hull of the vessel to the treatment system by the CSO recycle pump 17, as described, to be replaced with seawater ballast or treated plant effluent.

Figure 3:
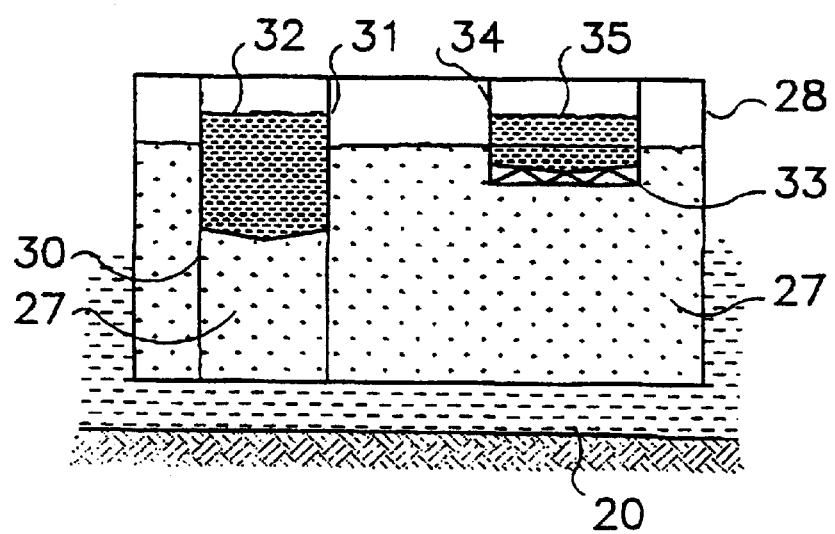
FIG. 3 is a cross-sectional elevation of a process tank support structure depicting two different systems utilizing the buoyant force of the underlying liquids in assist of supporting live and dead loads from the process tanks.

In accordance with another important feature of the apparatus and method disclosed, is the use of the buoyant force of the ballast and CSO to support the weight of the heavy waste-filled containers of the treatment plant, as depicted in FIG. 3.

FIG. 3 is a cross-sectional elevation of a process tankage supporting structure typical of the system of this invention, depicting two different methods whereby waste filled treatment plant tankage 31 and 34 is supported by the buoyant force of the underlying fluid 27 within the hull of the floating vessel 28, which floating vessel may further be supported by the sea bed 20 in the case of the optional gravity-based treatment plant. A first method of support depicted in FIG. 3 utilizes structural foundations 30 supported by the hull of the vessel 28 to provide partial support for plant tankage 31 containing waste 32, which tankage is further supported by the buoyant force of the underlying fluid 27. A second method depicted in FIG. 3 utilizes enclosed floating buoyancy chambers 33 to provide bottom support for plant tankage 34 containing waste 35, the integrated tankage and buoyancy chambers being fully supported by the buoyant force of the underlying fluid 27, without the need for additional structural foundation support. The buoyant force of the fluid underlying treatment tanks supports the heavy waste-filled containers 31 and 34 and their respective fluids 32 and 35 within the structure at the elevated levels depicted in FIG. 3. Treatment tank fluid levels are thereby maintained at elevations higher than the surrounding sea-level and underlying ballast or CSO sewage, to achieve gravity flow through the sewage treatment facility and into the marine outfall or alternatively into the hull of the vessel.

The invention and its advantages are readily appreciated from the preceding description. Various changes may be made in the form, construction and arrangement of the sewage treatment facility and the CSO accommodation and handling facility and process tankage support means without departing from the spirit and scope of the invention or sacrificing its material advantages. The described and illustrated systems are merely preferred embodiments.

What is claimed is:

1. In a moored floating or fixed gravity-based platform having a water-displacing hull supporting a sewage treatment plant for the treating of municipal sewage in which the treatment plant is operatively connected to a combined municipal sewage and storm water sewer outfall and a marine outflow for treated effluent from the treatment plant and has a maximum treatment capacity limited by the maximum flow-through capacity of the sewage treatment plant and in which the platform includes water ballast tanks normally holding water ballast, means for diverting overload combined sewage and storm water outflow in excess of the maximum treatment capacity of the treatment plant into the water ballast tanks and means for discharging the contained water ballast displaced by such overload into the treatment plant outflow.

2. Apparatus according to claim 1 including means within the ballast tanks to minimize mixing of the combined municipal sewage and storm water with the water ballast contained within the ballast tanks.

3. Apparatus according to claim 2 in which such means comprise a plurality of baffles within the ballast tanks adapted to minimize contamination of the water ballast remaining within the ballast tanks, by the combined municipal sewage and storm water charged into the ballast tanks.

4. Apparatus according to claim 1 additionally including means for returning such oveload combined sewage and storm water into the treatment plant for processing when such plant overload condition has been normalized.

5. Apparatus according to claim 1, in which the treatment plant includes treatment vessels exposed for buoyancy support from the water ballast.

6. A method of accommodating combined municipal sewage and storm water sewer outfall in a sewage treatment facility according to claim 1 in which the volume of the combined municipal sewage and storm water sewer outfall is temporarily in excess of the maximum treatment capacity of the treatment facility which comprises the steps of:

diverting such excess into the water ballast tanks, thereby to displace ballast water from the water ballast tanks into the treatment plant outflow;

retaining such excess in the water ballast tanks until the excess condition is relieved;

returning such excess into the sewage treatment facility by displacement thereof from the water ballast tanks by water ballast delivered into the water ballast tanks.

\* \* \* \* \*